United States Patent
Greenbaum et al.

(10) Patent No.: US 9,703,987 B2
(45) Date of Patent: Jul. 11, 2017

(54) IDENTITY BASED CONNECTED SERVICES

(71) Applicant: Syntonic Wireless, Inc., Seattle, WA (US)

(72) Inventors: Gary Scott Greenbaum, Mercer Island, WA (US); Rahul Agarwal, Bellevue, WA (US)

(73) Assignee: Syntonic Wireless, Inc., Seattle, Wake Island ( * ) Notice: Subject to any disclaimer, the term of this patent is extended or adjusted under 35 U.S.C. 154(b) by 0 days.

(21) Appl. No.: 14/268,934

(22) Filed: May 2, 2014

(65) Prior Publication Data

US 2015/0020148 A1 Jan. 15, 2015

Related U.S. Application Data

(60) Provisional application No. 61/818,518, filed on May 2, 2013.

(51) Int. Cl.
| | | |
|---|---|---|
| G06F 17/00 | (2006.01) | |
| G06F 21/62 | (2013.01) | |
| G06F 21/33 | (2013.01) | |
| H04L 29/06 | (2006.01) | |
| H04W 4/00 | (2009.01) | |
| H04W 12/06 | (2009.01) | |
| H04W 8/24 | (2009.01) | |

(52) U.S. Cl.
CPC .......... G06F 21/6281 (2013.01); G06F 21/33 (2013.01); H04L 63/10 (2013.01); H04W 4/00 (2013.01); *G06F 2221/2129* (2013.01); *H04W 8/24* (2013.01); *H04W 12/06* (2013.01)

(58) Field of Classification Search
CPC ......... G06F 21/6281; G06F 2221/2129; H04L 63/0884; H04L 63/10; H04L 63/205; H04W 12/06
USPC .................................. 726/1, 4–6, 8; 713/168
See application file for complete search history.

(56) References Cited

U.S. PATENT DOCUMENTS

| | | | | |
|---|---|---|---|---|
| 5,689,638 A * | 11/1997 | Sadovsky | ............... | G06F 21/31 707/999.009 |
| 7,240,364 B1 * | 7/2007 | Branscomb | ....... | H04L 29/12113 726/5 |
| 7,509,672 B1 * | 3/2009 | Horwitz | .................. | G06F 21/41 726/8 |
| 7,958,226 B2 * | 6/2011 | Bernardi | ........... | H04L 29/12207 340/5.61 |
| 8,195,819 B1 * | 6/2012 | Delker | .................... | G06F 21/41 709/229 |

(Continued)

*Primary Examiner* — Samson Lemma

(57) ABSTRACT

Embodiments of the disclosure are directed towards a system and method for enabling an identity based connected service employing a "bound to identity" application usage model. The identity based connected service supports network access for the computing devices based on network connectivity associated with a device application. The system and method use the network access associated with the device application to communicate application state changes in a manner such that any instance of the device application executing on any of the computing devices associated with the same end-user identity remain coherent and consistent. The system and method authenticates an instance of the device application with a single authentication of the device application to an associated resource server.

20 Claims, 6 Drawing Sheets

(56) References Cited

U.S. PATENT DOCUMENTS

| | | | | |
|---|---|---|---|---|
| 8,595,788 | B2* | 11/2013 | Lim | H04L 63/20 |
| | | | | 726/1 |
| 8,990,920 | B2* | 3/2015 | Pontillo | H04W 12/02 |
| | | | | 713/152 |
| 2006/0075230 | A1* | 4/2006 | Baird | H04L 63/083 |
| | | | | 713/168 |
| 2007/0233804 | A1* | 10/2007 | Palekar | H04L 67/08 |
| | | | | 709/208 |
| 2008/0301298 | A1* | 12/2008 | Bernardi | H04L 29/12207 |
| | | | | 709/226 |
| 2014/0254546 | A1* | 9/2014 | L'Heureux | H04W 12/06 |
| | | | | 370/331 |

* cited by examiner

Credentials

| User | User Application ID | User Ntwk ID | Device ID |
|---|---|---|---|
| 1 | U1_A1_ID | U1_Ntwk1_ID<br>U1_Ntwk2_ID<br>U1_Ntwk1_ID<br>U1_Ntwk3_ID | A<br>B<br>C<br>D |
|   | U1_A2_ID | U1_Ntwk1_ID<br>U1_Ntwk1_ID<br>U1_Ntwk3_ID | A<br>C<br>D |
| 2 | U2_A1_ID | U2_Ntwk2_ID<br>U2_Ntwk1_ID<br>U2_Ntwk4_ID | B<br>E<br>F |
|   | U2_A2_ID | U2_Ntwk1_ID<br>U2_Ntwk4_ID<br>U2_Ntwk1_ID<br>U2_Ntwk2_ID | E<br>F<br>G<br>H |
|   | U2_A3_ID | U2_Ntwk1_ID<br>U2_Ntwk1_ID | B<br>C |

Credentials

FIG. 5

IDENTITY BASED CONNECTED SERVICES

RELATED APPLICATIONS

This application claims priority under 35 U.S.C. Section 119(e) to U.S. Provisional Application Ser. No. 61/818,518, filed May 2, 2013 entitled "Identity Based Connected Services," the disclosure of which is incorporated by reference herein in its entirety.

BACKGROUND

End-user interaction with a computing device is mediated by device applications resident on a computing device. A device application on a specific computing device that is available to all end-users on the computing device has a usage policy commonly referred to as "bound to device." An alternative and common application usage policy is "bound to identity," in which an end-user can engage with the device application on multiple computing devices using the same end-user identity. In a "bound to identity" model, validating the end-user identifying credentials is a precondition for permitting the end-user to engage with the device application.

The "bound to identity" application usage policy is the policy most deployed with modern device applications. These modern device applications change internal state during end-user interactions in which the device applications access remote networked resources. The device applications access the remote networked resources through adaptors on the portable computing devices. The adaptors support wireless network standards, such as Global System for Mobile Communications (hereinafter referred to as GSM), IEEE 802.11, or the like. In a system implementing a "bound to identity" application usage policy, an end-user expects application coherency and consistency among all computing devices associated with the end-user. Therefore, the current systems implementing "bound to identity" application usage policies require the end-user to have access to a physical network for each computing device in order for the device application to provide internal state updates so that all the available computing devices associated with the end-user remain coherent and consistent between each other when the end-user interacts with the device application on any one of the available computing devices. The physical network, however, is "bound to device," meaning network access is bound to the computing device authenticated by a device identifier, such as the International Mobile Station Equipment Identity (IMEI) used by a GSM network, and a network subscriber identifier, such as a Subscriber Identity Module (SIM) used for device authentication over a GSM network. If the computing device is not authenticated for network access over the physical network, the "bound to identity" model for device applications cannot be realized. Therefore, in order to realize a "bound to identity" application usage model, current "bound to identity" systems require a separate data plan contract for each computing device. The data plan is bound to the computing device and, in some plans, bound to additional related computing devices. The data plan specifies an amount of data that the computing device may consume while operating over a provider's network.

SUMMARY

Embodiments of the disclosure are directed towards a system and method for enabling an identity based connected service employing a "bound to identity" application usage model. The identity based connected service supports network access for the computing devices based on network connectivity associated with a device application. The system and method use the network access associated with the device application to communicate application state changes in a manner such that any instance of the device application executing on any of the computing devices associated with the same end-user identity remain coherent and consistent. The system and method authenticates an instance of the device application with a single authentication of the device application to an associated resource server.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 is another exemplary representation of a structure for storing credentials suitable for use in the components illustrated in FIGS. 2-3 when authenticating a device application.

DETAILED DESCRIPTION

Figure 1:
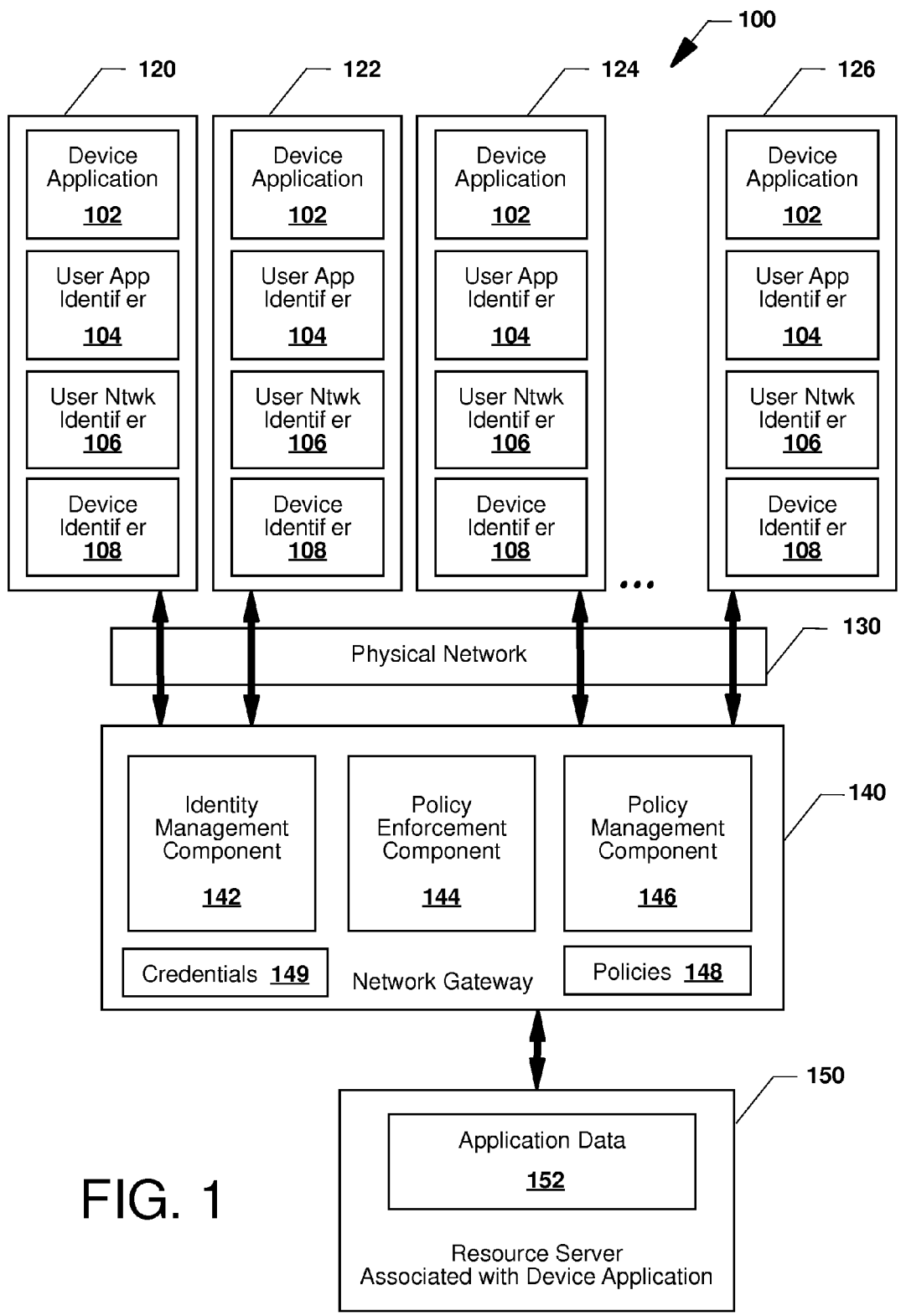
FIG. 1 is a system view of components for implementing at least one embodiment of the system in accordance with the present disclosure.

The following disclosure describes a system and method for enabling an identity based connected service employing a "bound to identity" application usage model. In contrast with current systems implementing a "bound to identity" application usage model, the present identity based connected service does not require a data plan contract for each computing device. Briefly, in overview, instead of requiring a data plan, the identity based connected service supports network access for the computing devices based on network connectivity associated with a device application. The network access may be supported through an agreement between a network provider and an end-user and the agreement describes the delivery of network access to the computing device associated with the end-user. Before describing the identity based connected service further, a description of certain terms used through-out the disclosure is provided. The term network access refers to any access over a physical network. This network access may be provided by a cellular network, a wireless network, a wireless local area network (WLAN), or the like. The term network connectivity refers to a type of network access associated with a specific device application and provided by a network provider for delivery of network access to the computing device of an associated end-user. In other words, the network provider for a device application is based on the network connectivity associated with the device application for a particular end-user. The term independent network connection refers to a specific network connection for facilitating exchanges of data between a device application and an associated resource server over a physical network. The independent network connection is based on the network connectivity associated with the device application.

Continuing with the overview, the identity based connected service authenticates the device application and once authenticated, allows an instance of the device application executing on one of the computing devices to access a remote resource server associated with the device application. States changes of the executing instance are communicated in a manner such that the device applications associated with the same end-user, but residing on different computing devices, remain coherent and consistent. The present system offers several advantages over existing "bound to identity" application usage policy systems, such as eliminating the requirement for end-users to acquire separate data plan contracts for each computing device. In addition, end-users only need to submit authenticating credentials once, one with the device application, not for the network, in order for their device application to secure access to the associated remote resource server. With these advantages, the present system improves upon prior art systems implementing "bound to identity" application usage policies. In one scenario, the present system allows an employer to provide a work-related application to a mobile employee who can use any computing device to access the work-related application. The work-related application is associated with network access that allows the work-related application to communicate with a remote resource server for work-related data, but does not enable network access for other non work-related applications.

FIG. 1 is a system view of components for implementing at least one embodiment of the system in accordance with the present disclosure. System 100 includes a physical network 130, a network gateway 140, a resource server 150, and a device application 102 residing on any number of computing devices, such as computing devices 120-126. While each of the computing devices 120-126 may be configured differently and/or be manufactured from different suppliers, each computing device may run an instance of device application 102 that is configured to access application data 152 residing on a resource server 150 associated with the device application 102. While the device application may interact with more than one resource server, for convenience, only one resource server is shown in FIG. 1. Also, one skilled in the art will appreciate that each computing device 120-126 typically has multiple device applications, but for convenience, FIG. 1 illustrates one device application to better illustrate and explain the present disclosure of identity based connectivity services.

Figure 4:
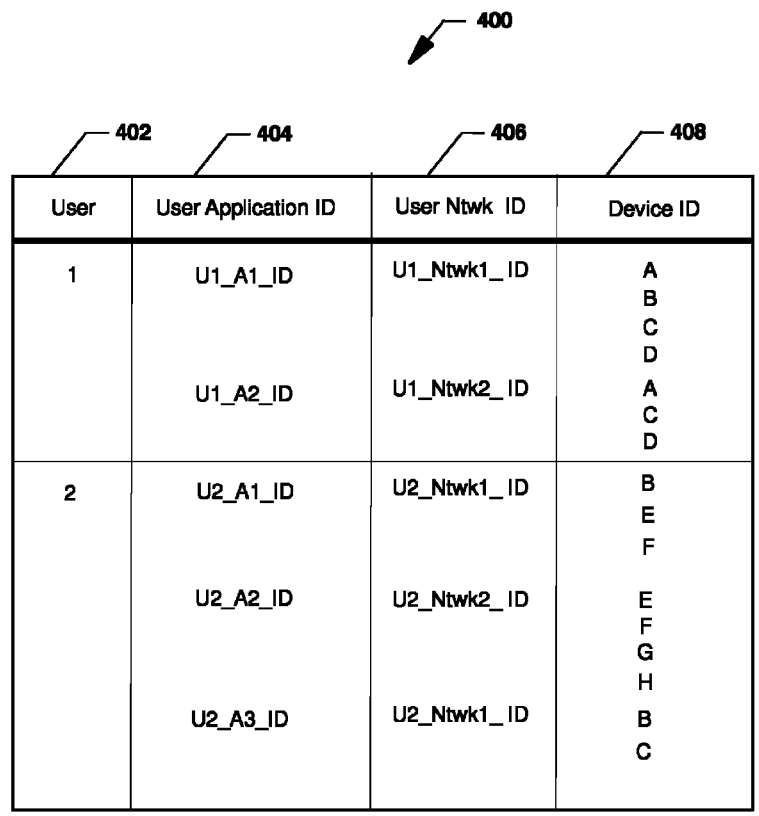
FIG. 4 is an exemplary representation of a structure for storing credentials suitable for use in the components illustrated in FIGS. 2-3 when authenticating a device application.

The network gateway 140 includes an identity management component 142, a policy enforcement component 144, and a policy management component 146. The identity management component 142 is configured to determine network access for end-user identities across various user network identifiers assigned to end-users. The identity management component 142 may optionally store these end-user identities and user network identifiers in a structure represented in FIG. 1 as credentials 149. An exemplary structure for credentials 149 is illustrated in FIG. 4 and will be described later in detail in conjunction with FIG. 4. The policy enforcement component 144 is configured to enforce network access rules to permit or deny communications between the device application 102 and the resource server 150 based on an application policy and a network access policy, represented as policies 148. When the policy management component 146 confirms permission of a device application 102 and connectivity usage for an end-user interacting with the device application 102 resident on a computing device (e.g., computing device 120), the network gateway 140 allows the device application 102 to retrieve application state and content (represented as application data 152) from a resource server 150 and to communicate updates of the device application state. The network communication between the device application 102 and the resource server 150 is transmitted through the network gateway 140.

The network gateway 140 provides common functionality for routing network traffic across heterogeneous networks. The network gateway 140 routes the network traffic coming from and going to computing devices 120-126 via a physical network 130. The physical networks 130 may be heterogeneous networks. For example, a physical network 130 may be a cellular network, a wireless network, a wireless local area network (WLAN), or the like. The network configuration uses common configurations known in the art. The network gateway 140 translates incoming network protocols to appropriate outbound network protocols and enforces access policies between device application 102 and remote resource server 150. In one embodiment, the network gateway 140 may be a business information technology (IT) gateway server that proxies network traffic from a corporate network, i.e. intranet, to the public Internet. In this embodiment, one or more of the computing devices 120-126 may be connected to the corporate local area network, LAN, via a fixed line network connection, such as Ethernet.

As will be described in more detail in conjunction with FIG. 2, system 100 is configured to enable identity based connected services employing a "bound to identity" application usage model. The identity based connected service supports network access for the computing devices based on network connectivity associated with the device application. The identity based connected service authenticates the device application and once authenticated, allows an instance of the device application executing on one of the computing devices to access a remote resource server associated with the device application. States changes of the executing instance are communicated in a manner such that the device applications associated with the same end-user, but residing on different computing devices, remain coherent and consistent.

Importantly, the network connectivity associated with device application 102 is not associated with a user computing device, but is instead associated with a user application (i.e., device application 102). Thus, in accordance with the present disclosure, a single purchase of device application 102 provides application functionality as well as network connectivity for multiple computing devices. This network connectivity is independent from the computing devices, and authentication for the network connectivity may be based on a user identity associated with the device application. When the device application 102 is installed, the device application 102 may be associated with the user identity of the end-user for whom the device application is installed. This association of the device application 102 with the user identity is represented as a user application identifier 104. In addition, the user identity of the end-user may be associated with a network provider as described in the agreement for the network connectivity. This association of the user identity with the network provider is represented as a user network identifier 106. The user application identifier and the user network identifier are stored in a manner such that the network gateway can access these identifiers (represented as credentials 149 in FIG. 1) when authenticating the device application 102 for access to the associated resource server 150, thereby enabling identity based connected services. A subset of the credentials 149 that are associated with a particular end-user may also be stored on computing devices associated with the end-user. The actions during installation and authentication are illustrated in FIG. 2 and will be described in detail later in conjunction with FIG. 2. In overview, when the installed device application is activated on the computing device, the network provider associated with the device application 102 provides a persistent online control channel for the computing device. The computing device may transmit authenticating credentials to the network gateway on the persistent control channel and the network gateway may authenticate the device application based on the credentials. The persistent control channel provided by the associated network provider may also allow other radio functions. In accordance with the present disclosure, the identity based connected services, supports an individual network connection for each instance of a device application on the multiple computing devices. Each individual network connection supports data communication between the instance and the associated resource server 150. Each individual network connection adheres to the agreement regarding delivery of network access according to the network connectivity associated with the device application. For example, one network connection may be provided by an application provider sponsoring a trial offer to its associated application data 152. When there are multiple device applications on one computing device, each device application is associated with its own individual network connection as defined by the network connectivity associated with that device application.

The network connectivity associated with a device application is achieved by setting a network access policy for the device application for a particular end-user in a policy management component 146 in the network gateway. This network access policy is accessed by the policy enforcement component 144 to determine whether the particular end-user interacting with the device application 102 is permitted access to the application data 152 on the resource server 150 that is associated with the device application 102. In addition, an application usage policy is provided that permits execution of the device application by the end-user independent of the user device.

Each computing device 120-126 includes a user application identifier 104, a user network identifier 106, and a device identifier 108. The user application identifier 104 associates a user identity of a specific end-user with the device application 102. This association may occur when the device application 102 is installed, when it is purchased, or upon any other time and/or event. In one embodiment, the user application identifier may include a user name and an optional password. However, other variations of the user application identifier 104 that associates the user with the device application may be implemented. The user network identifier 106 is unique to an end-user and most often associates the user identity with a network provider. The user network identifier may include an International Mobile Subscriber Identity (IMSI) which is used to identify the end-user of a cellular network and is a unique identification associated with all GSM networks. The device identifier 108 is unique to the associated computing device. In one implementation, the device identifier 108 may be defined by combining various hardware component identifiers using known standard methods. For example, the device identifier 108 may include the radio identifier of the computing device, such as the International Mobile Station Equipment Identity (IMEI) or Mobile Equipment Identifier (MEID). An exemplary representation of a structure for storing credentials, illustrated in FIG. 4 and described in detail later in conjunction with FIG. 4, may store the user application identifier 104, user network identifier 106, and/or device identifier 108 that are suitable for use in authentication of the device application in accordance with the present identity based connected services.

While FIG. 1 and the corresponding description describes the interaction between several components, it can be appreciated that such components can include additional or fewer components or the functionality described for one component can be combined with another component without departing from the claimed invention. Thus, the described functionality of the components can be implemented using various permutations and combinations of components. In another implementation of the present identity based connected services, a single computing device (e.g., computing device 120) may assume multiple end-user identities, commonly referred to as supporting "multiple tenancy." For this scenario, the present identity based connected service identifies each tenancy as a separate computing device—end-user association having its own user application identifier 104 and user network identifier 108.

Figure 2:
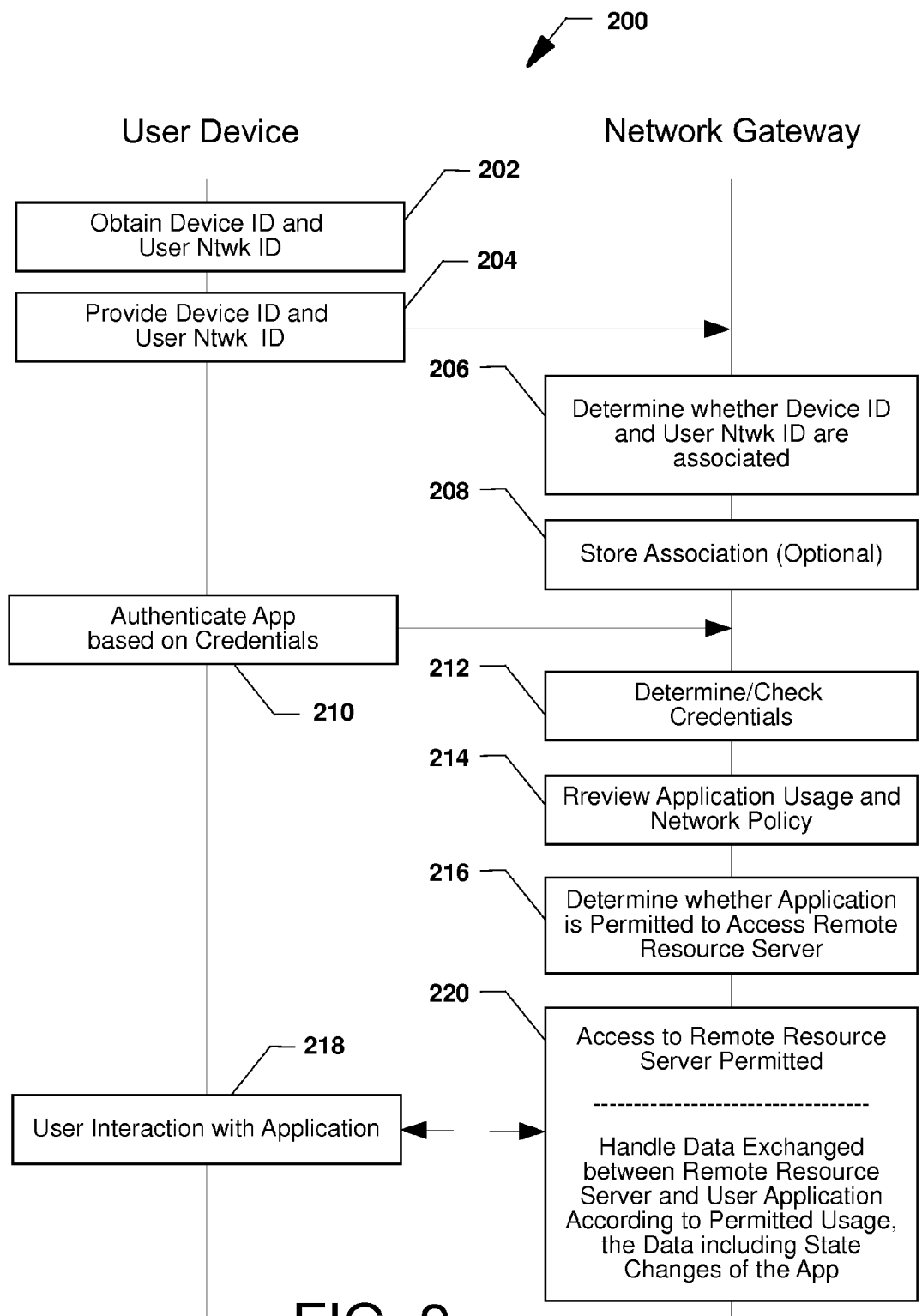
FIG. 2 is a diagram illustrating a functional flow of actions of the components illustrated in FIG. 1.

FIG. 2 is a diagram illustrating a functional flow of actions of the components illustrated in FIG. 1. The actions include processing performed by one of the computing devices 120-126 (e.g., computing device 120 in FIG. 1, referred to as user device in FIG. 2) and network gateway 140 (FIG. 1) and communications between the user device and the network gateway. FIG. 2 illustrates various actions that occur and one skilled in the art will appreciate that certain actions may occur once or multiple times and may occur in a different order than as described below. Thus, the following describes processing and communications suitable for use in one or more embodiments of an identity based connected services in accordance with the present disclosure.

At block 202, a user device obtains a device identifier associated with the user device and a user network identifier associated with a physical network. The user network identifier is unique to an end-user and is most often associated with a network provider. The user network identifier may include an International Mobile Subscriber Identity (IMSI) which is used to identify the end-user of a cellular network and is a unique identification associated with all GSM networks. The device identifier is unique to the associated user device. In one implementation, the device identifier may be defined by combining various hardware component identifiers using known standard methods. For example, the device identifier may include a radio identifier of the computing device, such as IMEI or MEID. The user network identifier may be stored on the user device upon some event, such as upon installation of a device application that is associated with network connectivity provided by a network provider. Thus, continuing with the example above, the application provider sponsoring the trial offer to its associated application data may offer their sponsored service (e.g., trial offer) exclusively to a particular network provider. Thus, during installation, the user network identifier would be associated with the end-user for that particular network provider. Block 202 may be initiated when powering up the user device, upon user selection, and/or upon another event.

At block 204, the user device provides the device identifier and the user network identifier to the network gateway associated with the network access provider for the device application. The network provider associated with the device application provides a persistent, online control channel for the user device. The user device may transmit the device identifier and the user network identifier to the network gateway on the persistent control channel. Again, transmission of the device identifier and the user network identifiers may occur upon powering up of the user device, upon user selection, and/or upon another event, such as an installation of a device application.

At block 206, the network gateway determines whether the device identifier and the user network identifier have been previously associated. This association may optionally occur when the device application is installed on the user device. Determining whether the device identifier and the user network identifier are associated needs only to occur once, but may occur multiple times without departing from the scope of the claimed invention. In one implementation, the network gateway determines whether the device identifier and user network identifier are associated upon initialization of the user device. In the case where end-user credentials vary from device to device (e.g., different IMSIs per device), the network gateway may communicate with an appropriate trust authority that has assigned the multiplicity of end-user credentials to determine whether the device identifier and the user network identifier can be associated.

At block 208, the association of the device identifier and the user network identifier may be stored for future access when the network gateway needs to determine the association. In one embodiment, if the association had not been previously stored, the network gateway stores the association with other associations at block 208.

At block 210, the user device sends a request to the network gateway to authenticate the device application, thereby granting permission to the end-user to interact with the device application. The request includes the user application identifier previously entered by the end-user during installation of the device application and subsequently cached by the device application. The user application identifier uniquely associates the end-user with the device application. The user application identifier may include a username associated with the end-user. The application identifier may also be a biometric parameter (e.g., a finger print, eye scan, or the like) associated with the end-user for the device application. The user application identifier, such as a username, need not be entered as long as the end-user is authenticated as the end-user of the device application by some other mechanism, such as entry of a security code to access the device application that is associated with the end-user.

At block 212, the network gateway checks credentials to determine whether the user network identifier, the device identifier, and the user application identifier have been previously associated. In one embodiment, this determination may be performed via a database query. If the association has not been previously stored, actions 200 may terminate. Block 212 may be performed by the identity management component 142 shown in FIG. 1.

At block 214, the network gateway reviews an application usage and network policy based on the association. For device applications conforming to a "bound to identity" usage policy, an end-user allowed to interact with the device application will be allowed to interact with the device application on any user device. This "bound to identity" usage policy will be reflected in the application usage and network policy associated with the provided credentials. In one embodiment, determining the associated application usage and network access policy may be performed through a database query using the device identifier, user network identifier, and/or user application identifier as one or more query keys. The network access and usage policies may be added to the database when the device application is acquired and/or installed on the user device. In one embodiment, block 214 may be performed by the policy management component 146 shown in FIG. 1.

At block 216, the network gateway determines whether the device application is permitted access to the requested remote resource server. If the device application is permitted to access the requested remote resource server, the network gateway provides an independent network between the device application and the requested remote resource server based on the network connectivity associated with the device application. In one embodiment, the determination in block 216 is performed by the policy management component 146 shown in FIG. 1 and communicated to the enforcement component 144 shown in FIG. 1.

At block 218, if the device application is authenticated, the end-user may begin interacting with the device application. At block 220, the network gateway facilitates data exchanges between the remote resource server and the device application as the end-user interacts with the instance of the device application. For network resource requests made by the application, the network gateway facilitates the data exchange based on permitted usage policies associated with the device identifier, user network identifier, and/or the user application identifier. In one embodiment, the network gateway 140 shown in FIG. 1 proxies communications and data between the device application and the resource server. The data between the device application and the resource server includes state changes of the instance as the device application executes on the user device. The state changes are stored in a manner to provide coherency for a subsequent instance of the device application residing on another user device associated with same user identity to interact with the application. If, at block 218, the access to the remote resource server is not permitted, actions 200 terminate.

One skilled in the art will appreciate that the above communications uses a single authentication of the end user to the resource server. With this single authentication the present identity based connected services can establish network connection and authenticate a user's access to a remote resource server from an associated device application. Coherency between instances of the device application are also ensured across user devices because each of the device applications have their own data access.

Figure 3:
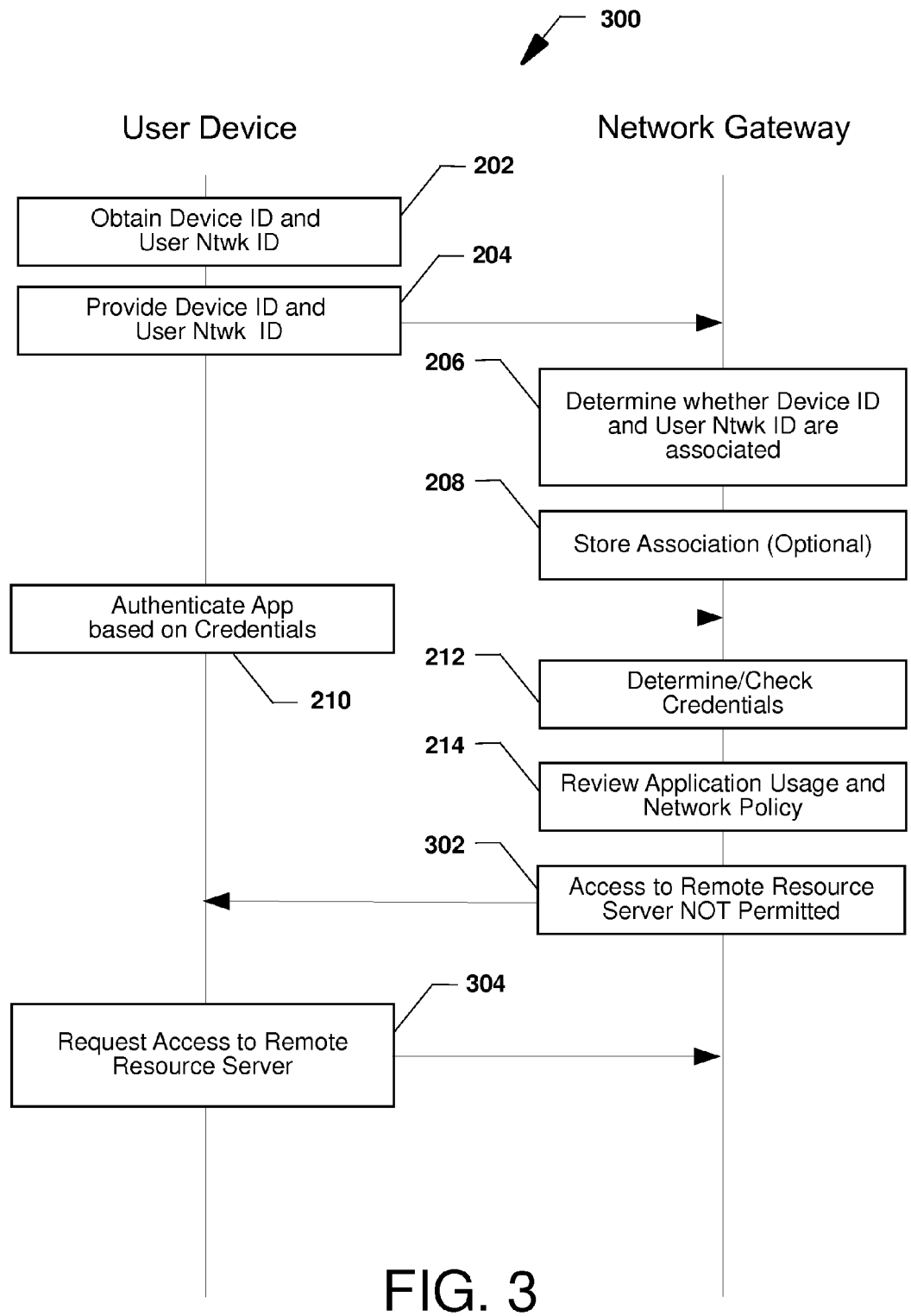
FIG. 3 is a diagram illustrating another functional flow of actions of the components illustrated in FIG. 1.

FIG. 3 is a diagram illustrating another functional flow of interactions of the components illustrated in FIG. 1. Like reference numerals remain the same throughout FIGS. 2-3. One will note that in functional flow 300, blocks 202-216 are as described in conjunction with FIG. 2 above. At block 302, a request is sent to the user device if the access to the remote resource server is not permitted. The user device receives the request and at block 304 requests access to the associated resource server. Block 304 may initiate an installation process of the device application associated with the requested resource server, which may obtain a user network identifier associated with the device application as illustrated in block 202 and described above.

FIG. 4 is an exemplary representation of a structure for storing credentials suitable for use in the components illustrated in FIGS. 2-3 when authenticating the device application to access the associated remote resource server. In one embodiment, the structure may include a database. The structure 400 includes a user field 402, a user application ID field 404, a user network ID field 406, and a device ID field 406. The user field 402 identifies a unique individual (i.e., end-user). The user application ID field 404 identifies a device application associated with the end-user. The user network ID field 406 identifies a network provider for connecting the device application to the remote application resource. The Device ID field 408 identifies a unique device identifier for an associated computing device. Each end-user has at least one associated user application identifier (e.g., U1_A1_ID, U1-A2_ID for user 1), associated with applications A1 and A2. As described above, the end-user may use device application (e.g., A1) associated with the user application identifier on multiple computing devices (e.g., Device ID A, B, C D for user application identifier U1_A1_ID). Structure 400 stores the credentials for the end-user for each device application associated with the end-user. Thus, the end-user may have multiple user application identifiers, one for each device application associated with the end-user.

FIG. 4 represents an embodiment in which a single user-network identifier may be associated with one end-user for the associated device application. For this embodiment, the single user-network identifier identifies a network provider delivering network access for the associated device application on multiple computing devices. The network provider delivering network access on the different computing devices may be determined based on the agreement for the network connectivity associated with the device application. This embodiment is illustrated in FIG. 4, which illustrates User 1 being associated with two device applications (A1 and A2) having respective user application identifiers U1_A1_ID and U1_A2_ID. FIG. 4 further illustrates that User 1 is associated with a network provider using the user network identifier U1_Ntwk1_ID for device application A1 and user network identifier U1_Ntwk2_ID for device application A2. User 1 installed device application A1 on the computing devices associated with device identifiers A, B, C, and D and installed device application A2 on computing devices associated with device identifiers A, C, and D. One will recognize that even though application A1 and A2 both execute on computing devices with device identifiers A and C, the user network identifier is different for both device applications. Thus, the network provider specified in the respective agreements for the connectivity associated with the respective device applications are different in the illustrated example. However, the network provider may have been specified as the same. FIG. 4 illustrates User 2 being associated with three device applications (A1, A2, and A3) having respective user application identifiers U2_A1_ID, U2_A2_ID, and U2_A3_ID. FIG. 4 illustrates User 2 being associated with a network provider using the user network identifier U2_Ntwk1_ID for device application A1, user network identifier U2_Ntwk2_ID for device application A2, user network identifier U2_Ntwk1_ID for device applicaton A3. User 2 installed device application A1 on the computing devices associated with device identifiers B, E, and F; installed device application A2 on computing devices associated with device identifiers E, F, G, and H; and installed device application A3 on computing devices associated with device identifiers B and C. One will note in the example representation in FIG. 4, User 1 and User 2 both are associated with computing devices having a device identifiers B and C and are both associated with device application A1 and A2. The illustrated example shows the network provider (i.e., Ntwk1 and Ntwk2) to be respectively associated with device applications A1 and A2. These associations are determined by the underlying agreements for the network connectivity associated with the respective device application.

FIG. 5 represents an embodiment in which a single user-network identifier may be associated with a specific computing device, such as when a SIM is assigned to the specific computing device for an end-user. The user field 402, user application ID field 404, and device ID field 408 are storing identical information as shown in FIG. 4. However, information stored in the user network ID field 406 is different. In this embodiment, the computing device may only support one network provider. Thus, each of the device applications on that computing device are associated with the same user network identifier. For example, device application A1 and A2 associated with User 1 are both installed on a computing device with device ID A. Thus, the user network identifier are the same (e.g., U1_Ntwk1_ID). In a further refinement, if two end-users are authorized to install device applications on the same computing device, both end-users will be associated with the same user-network identifier. For this scenario, the identity based connected services internally determines the binding in a manner to differentiate the provided services for each of the two individual users that are authorized to use the same computing device. These and other variations for binding user-application identifiers, user network identifiers, and device identifiers are envisioned.

Figure 6:
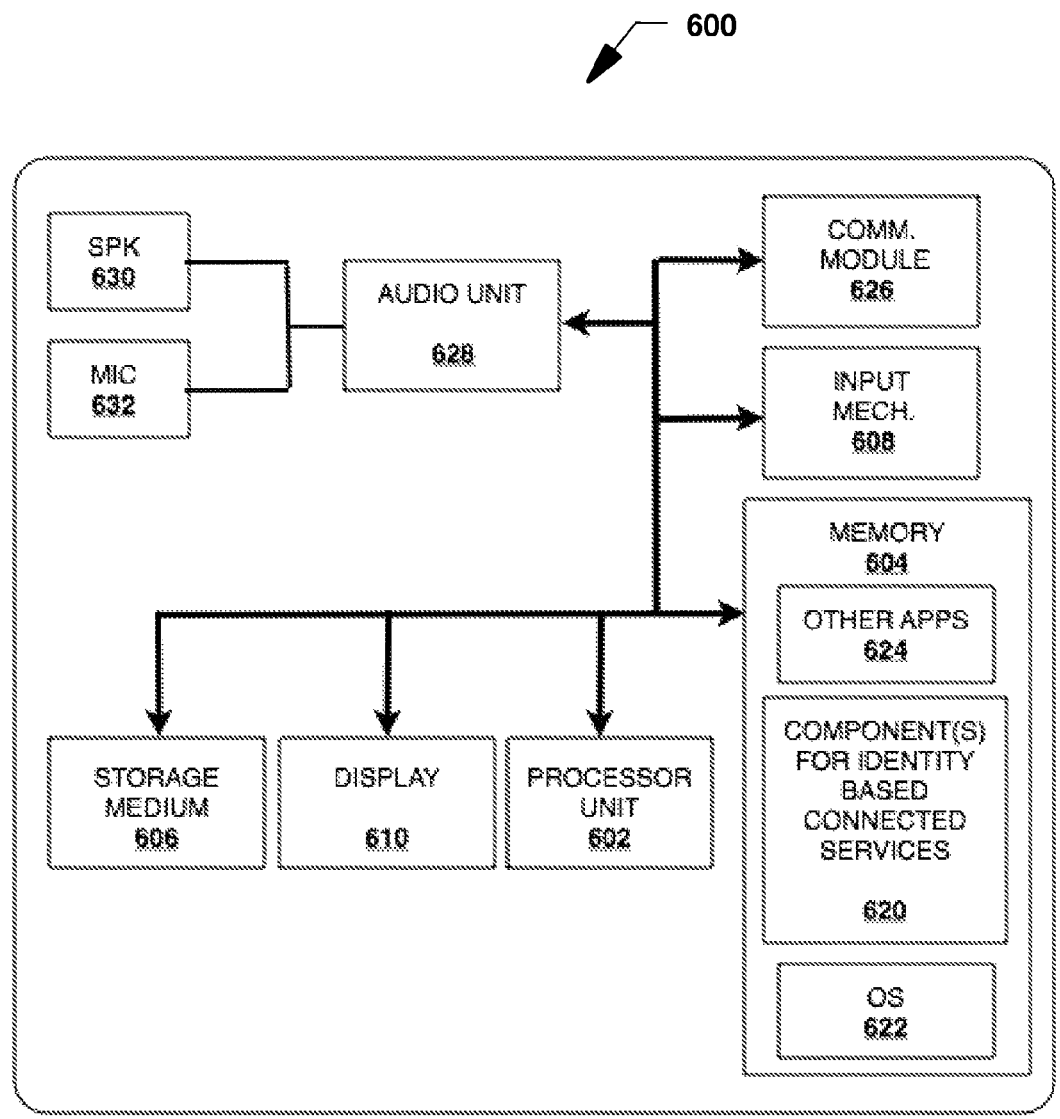
FIG. 6 is a functional block diagram representing a computing device for use in certain implementations of the disclosed embodiments or other embodiments of the components, such as illustrated in FIG. 1.

FIG. 6 is a functional block diagram representing a computing device suitable for use in the identity based connected services that provides a bound to identity application usage policy. For example, gateway network shown in FIG. 1 may be a computing device such as shown in FIG. 6. The computing device 600 includes a processor unit 602, a memory 604, a storage medium 606, an input mechanism 608, and a display 610. The processor unit 602 advantageously includes a microprocessor or a special purpose processor such as a digital signal processor (DSP), but may in the alternative be any conventional form of processor, controller, microcontroller, state machine, or the like.

The processor unit 602 is coupled to the memory 604, which is advantageously implemented as RAM memory holding software instructions that are executed by the processor unit 602. These software instructions represent computer-readable instructions and computer executable instructions. In this embodiment, the software instructions stored in the memory 604 include components (i.e., computer-readable components) for providing identity based connected services for enabling a bound to identity application usage policy 620, a runtime environment or operating system 622, and one or more other applications 624. The memory 604 may be on-board RAM, or the processor unit 602 and the memory 604 could collectively reside in an ASIC. In an alternate embodiment, the memory 604 could be composed of firmware or flash memory.

The storage medium 606 may be implemented as any nonvolatile memory, such as ROM memory, flash memory, or a magnetic disk drive, just to name a few. The storage medium 606 could also be implemented as a combination of those or other technologies, such as a magnetic disk drive with cache (RAM) memory, or the like. In this particular embodiment, the storage medium 606 is used to store data during periods when the computing device 600 is powered off or without power. The storage medium 606 could be used to store access policies, network rules, state graphs, and the like. It will be appreciated that the functional components may reside on a computer-readable medium and have computer-executable instructions for performing the acts and/or events of the various method of the claimed subject matter. The storage medium being on example of computer-readable medium.

The computing device 600 also includes a communications module 626 that enables bi-directional communication between the computing device 600 and one or more other computing devices. The communications module 626 may include components to enable RF or other wireless communications, such as a cellular telephone network, Bluetooth connection, wireless local area network, or perhaps a wireless wide area network. Alternatively, the communications module 626 may include components to enable land line or hard wired network communications, such as an Ethernet connection, RJ-11 connection, universal serial bus connection, IEEE 1394 (Firewire) connection, or the like. These are intended as non-exhaustive lists and many other alternatives are possible.

The audio unit 628 may be a component of the computing device 600 that is configured to convert signals between analog and digital format. The audio unit 628 is used by the computing device 600 to output sound using a speaker 630 and to receive input signals from a microphone 632. The speaker 632 could also be used to announce incoming calls.

A display 610 is used to output data or information in a graphical form. The display could be any form of display technology, such as LCD, LED, OLED, or the like. The input mechanism 608 includes keypad-style input mechanism and other commonly known input mechanisms. Alternatively, the input mechanism 608 could be incorporated with the display 610, such as the case with a touch-sensitive display device. Other alternatives too numerous to mention are also possible.

While the foregoing written description of the invention enables one of ordinary skill to make and use a system providing identity based connected services using a bound to identity application usage policy as described above, those of ordinary skill will understand and appreciate the existence of variations, combinations, and equivalents of the described embodiments, methods, and examples herein. Thus, the invention as claimed should therefore not be limited by the above described embodiments, methods, and examples, but by all embodiments and methods within the scope and spirit of the claimed invention.

The claimed invention is:

1. A system for enabling a bound to identity application usage policy, the system comprising:
   a non-transitory memory device for storing computer-readable instructions associated with a bound to identity usage policy; and
   a hardware processor programmed to execute the computer-readable instructions to enable the bound to identity usage policy, wherein when the computer-readable instructions are executed, the system is programmed to:
   authenticate an instance of a device application residing on one of a plurality of computing devices, the device application being associated with a user identity, the authentication being based on a credential;
   upon authenticating the instance, providing an independent network based on a network connectivity associated with the device application, the independent network supporting data exchanges between the instance and an associated resource server, wherein the data includes state changes of the instance as the device application executes on the one computing device, the state changes being stored in a manner to provide coherency for a subsequent instance of the device application residing on another computing device out of the plurality of computing devices, the subsequent instance being associated with the user identity, wherein the independent network based on the network connectivity is independent of the computing device, wherein the authentication of the device application occurs on a persistent control channel provided by a network provider associated with the device application and wherein a network gateway provides the independent network.

2. The system of claim 1, wherein authenticating the instance of the device application comprises a single authentication.

3. The system of claim 2, wherein the single authentication authenticates the device application to the associated remote resource server.

4. The system of claim 2, wherein the single authentication includes authenticating a user application identifier, user application identifier associating the user identity to the device application, the credential including the user application identifier.

5. The system of claim 1, wherein the credential include a device identifier that uniquely identifies the one computing device, a user application identifier that associates the user identity to the device application, and a user network identifier that associates the user identity to the independent network.

6. The system of claim 1, wherein the state changes are stored on the associated remote resource.

7. The system of claim 1, wherein the network connectivity associates a network provider responsible for delivering network access to enable the independent network.

8. The system of claim 7, wherein the network provider responsible for delivering network access to enable the independent network for the instance and the subsequent instance are different.

9. The system of claim 1, wherein authenticating the instance further comprises determining whether the device application has permission to access the associated resource server based on an application usage policy and on a network policy.

10. The system of claim 9, wherein the application usage policy and the network policy are identified in conjunction with installation of the device application on the one computing device.

11. The system of claim 1, wherein the one computing device supports a plurality of user identities and the user identity is one of the plurality of user identities.

12. A computer-implemented method comprising at least one hardware processor for enabling a bound to identity application usage policy, the computer-implemented method comprising:
   authenticating an instance of a device application residing on one of a plurality of computing devices via the at least one hardware processor, the device application being associated with a user identity, the authentication being based on a credential;
   upon authenticating the instance, providing an independent network based on a network connectivity associated with the device application, the independent network supporting data exchanges between the instance and an associated resource server, wherein the data includes state changes of the instance as the device application executes on the one computing device, the state changes being stored in a manner to provide coherency for a subsequent instance of the device application residing on another computing device out of the plurality of computing devices, the subsequent instance being associated with the user identity, wherein the independent network based on the network connectivity is independent of the computing device, wherein the authentication of the device application occurs on a persistent control channel provided by a network provider associated with the device application and wherein a network gateway provides the independent network.

13. The computer-implemented method of claim 12, wherein authenticating the instance of the device application comprises a single authentication to the associated remote resource.

14. The computer-implemented method of claim 13, wherein the single authentication includes authenticating a user application identifier, the use application identifier associating the user identity to the device application, the credential including the user application identifier.

15. The computer-implemented method of claim 12, wherein the credentials include a device identifier that uniquely identifies the one computing device, a user application identifier that associates the user identity to the device application, and a user network identifier that associates the user identity to the independent network.

16. The computer-implemented method of claim 12, wherein the network connectivity associates a network provider responsible for delivering network access to enable the independent network.

17. The computer-implemented method of claim 12, wherein authenticating the instance further comprises determining whether the device application has permission to access the associated resource server based on an application usage policy and on a network policy.

18. The computer-implemented method of claim 12, wherein the one computing device supports a plurality of user identities and the user identity is one of the plurality of user identities.

19. A network gateway, comprising:
a non-transitory memory device storing computer-readable components associated with a bound to identity application usage policy;
a hardware processor programmed to execute the computer-readable components to enable the bound to identity application usage policy, the computer-readable components comprising:

an identity management component configured to manage credentials including a plurality of device identifiers, a plurality of user network identifiers, and a plurality of user application identifiers, each of the device identifiers uniquely identifying one of a plurality of computing devices, each of the user network identifiers uniquely identifying an end-user associated with one of a plurality of networks, each of the plurality of user application identifiers uniquely associating the end user to one of a plurality of device applications, wherein each of the device applications is associated with a network connectivity, the identity management component being further configured to authenticate one of the device applications based on the credentials;

a policy management component configured to manage a plurality of network access policies where each network access policy is associated with one of the user application identifiers, each network access policy identifying permission for a respective device application to access an associated resource server; and a policy enforcement component configured to enable a network connectivity associated with the device application based on the user application identifier sent in a request from the one computing device, the network connectivity enabling an independent network for exchanging data between an instance of device application and an associated resource server, wherein the data includes state changes of the instance as the device application executes on the one computing device, the state changes being stored in a manner to provide coherency to a subsequent instance of the device application residing on another computing device out of the plurality of computing devices, the subsequent instance being associated with the user identity associated with the instance of the device application, wherein the independent network based on the network connectivity is independent of the computing device, wherein the authentication of the device application occurs on a persistent control channel provided by a network provider associated with the device application and wherein the network gateway provides the independent network.

20. The network gateway of claim 19, wherein the authentication comprises authenticating the instance of the application by performing a single authentication of the instance to the associated resource server.

* * * * *